United States Patent
Arrigo et al.

(10) Patent No.: US 9,982,450 B2
(45) Date of Patent: May 29, 2018

(54) POLE-CLAMP SYSTEM AND METHOD

(71) Applicants: Wendy Arrigo, Mississauga (CA); Michael Moore, Mississauga (CA)

(72) Inventors: Wendy Arrigo, Mississauga (CA); Michael Moore, Mississauga (CA)

(*) Notice: Subject to any disclaimer, the term of this patent is extended or adjusted under 35 U.S.C. 154(b) by 5 days.

(21) Appl. No.: 15/224,485

(22) Filed: Jul. 29, 2016

(65) Prior Publication Data
US 2018/0030748 A1    Feb. 1, 2018

(51) Int. Cl.
| | |
|---|---|
| *E04H 4/12* | (2006.01) |
| *E04H 4/16* | (2006.01) |
| *F16B 2/04* | (2006.01) |
| *F16M 13/02* | (2006.01) |

(52) U.S. Cl.
CPC .......... *E04H 4/1254* (2013.01); *E04H 4/1609* (2013.01); *F16B 2/04* (2013.01); *F16M 13/022* (2013.01)

(58) Field of Classification Search
CPC .. E04H 4/1254; E04H 4/1609; F16M 13/022; F16B 2/04
USPC ..................... 210/167.1, 232, 238
See application file for complete search history.

(56) References Cited

U.S. PATENT DOCUMENTS

| | | | |
|---|---|---|---|
| 4,789,470 A | 12/1988 | Wards | |
| 5,288,414 A | 2/1994 | Mongiello | |
| 5,525,217 A | 6/1996 | Fultop | |
| 5,849,184 A | 12/1998 | Veillet | |
| 6,315,911 B1 | 11/2001 | Radsky | |
| 6,398,952 B1 | 6/2002 | Baer | |
| 8,133,387 B2* | 3/2012 | DePinto | E04H 4/1254 210/167.19 |
| 2015/0308137 A1* | 10/2015 | Hodak | E04H 4/1254 210/167.18 |
| 2017/0130893 A1* | 5/2017 | Wichman | F16M 13/022 |

* cited by examiner

*Primary Examiner* — Fred Prince
(74) *Attorney, Agent, or Firm* — Integrity Patent Group, PLC; Edwin Wold

(57) ABSTRACT

A pole-clamping system including an upper-tubular-body, a lower-tubular-body, a locking-mechanism, an upper-foot, a lower-foot, and a pole-hook-mechanism. The pole-clamp system constructed with a net-positive-buoyancy such that the pole-clamp system floats in water. The pole-clamp system structured and arranged to be removably and adjustably insertable within a skimmer-inlet of a pool to hold a pool-accessory via the pole of the pool-accessory. The upper-tubular-circumference of the upper-tubular-body may be smaller in dimension than the lower-tubular-circumference of the lower-tubular-body such that the upper-tubular-body may be slideably insertable within the lower-tubular-body to allow for a variable-length of the pole-clamp system. The locking-mechanism selectively and securely locks the upper-tubular-body within the lower-tubular-body to maintain the variable-length of the pole-clamp system during use with the pole-hook-mechanism.

20 Claims, 5 Drawing Sheets

POLE-CLAMP SYSTEM AND METHOD

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pool skimmers and more specifically relates to a pole-clamping system.

2. Description of Related Art

A pool is a vessel filled with water to enable swimming, bathing, or other activities. Pools may built into the ground (in-ground) or constructed above ground. Most in-ground pools utilize a system of filtration and clarification to maintain the quality of the water contained within the pool, some of which may utilize automated or timed systems to clean pools. Additional methods of cleaning pools include the use of specialized tools or accessories mountable to a pole. The pole allows the user to access parts of the pool from the pool deck which cannot be accessed by hand.

An automated pool cleaner system sometimes includes a vacuum cleaner to collect debris and sediment from pools with minimal human intervention. In most cases, the automated cleaner system includes a skimmer inlet, which provides suction and the skimming of debris from the water surface, as well as a device which travels along the bottom of the pool collecting additional debris.

Often times, it may be necessary for pool cleaning professionals or other similar pool-oriented tradespersons to spot clean or use specialized equipment (e.g., brushes, wands, skimmers, etc.) to clean specific areas or components of a pool. One such limitation with the use of such equipment is the need to use long poles which are often long and cumbersome to remove and replace back into the pool as it may accumulate water within the pole assembly. Therefore a suitable solution is desired.

Several attempts have been made to solve the above-mentioned problems such as those found in U.S. Pat. No. 5,288,414 to Mongiello; U.S. Pat. No. 6,398,952 to Baer; U.S. Pat. No. 4,789,470 to Wards; U.S. Pat. No. 5,849,184 to Veillet; U.S. Pat. No. 6,315,911 to Radsky; and U.S. Pat. No. 5,525,217 to Fultop. This art is representative of pool skimmers. However, none of the above inventions and patents, taken either singly or in combination, is seen to describe the invention as claimed.

BRIEF SUMMARY OF THE INVENTION

In view of the foregoing disadvantages inherent in the known pool skimmers art, the present invention provides a novel pole-clamping system. The general purpose of the present invention, which will be described subsequently in greater detail is to provide a device useful for securely holding a pole of a pool accessory in an upright position using the skimmer inlet of a typical pool.

A pole-clamping system is disclosed herein, in a preferred embodiment, comprising an upper-tubular-body, a lower-tubular-body, a locking-mechanism, an upper-foot, a lower-foot, and a pole-hook-mechanism. Preferably, the pole-clamp system may be constructed with a net-positive-buoyancy such that the pole-clamp system floats in water. The pole-clamp system may be structured and arranged to be removably and adjustably insertable within a skimmer-inlet of a pool to hold a pool-accessory via the pole of the pool-accessory.

The upper-tubular-body may comprise an upper-end, a lower-end, and an upper-tubular-circumference, with the upper-end, the lower-end, and the upper-tubular-circumference being in functional and structural combination with each other. Similarly, the lower-tubular-body may comprise a top-end, a bottom-end, and a lower-tubular-circumference, a top-end, a bottom-end, and a lower-tubular-circumference being in functional and structural combination with each other.

The upper-tubular-circumference of the upper-tubular-body may be smaller in dimension than the lower-tubular-circumference of the lower-tubular-body such that the upper-tubular-body may be slideably insertable within the lower-tubular-body to allow for a variable-length of the pole-clamp system. The upper-tubular-body may be constructed from a plastic-material for increased corrosion resistance and longevity of use in a wet environment and, the lower-tubular-body may constructed from a similar plastic-material for the same increased corrosion resistance and longevity of use.

The locking-mechanism may selectively and securely locks the upper-tubular-body within the lower-tubular-body to maintain the variable-length of the pole-clamp system during use with the pole-hook-mechanism is affixed to the lower-tubular-body via a pair of loop-fittings. Preferably, the locking-mechanism may securely lock the upper-tubular-body within the lower-tubular-body via a lever-button.

Preferably the upper-foot may be affixable to the upper-tubular-body to provide increased traction during use and the lower-foot may be similarly affixable to the lower-tubular-body to provide increased traction during use. In the preferred embodiment, the upper-foot and the lower foot may each be constructed from a rubberized material for increased traction during use. In the preferred embodiment, both the upper-foot and the lower-foot may be removable and replaceable.

In the preferred embodiment, the pole-hook-mechanism may be constructed from a stainless-steel material for strength, durability and longevity during use and may further include an outer-sleeve constructed from rubberized material to increase the gripping ability of the pole-hook-mechanism during use. The pole-hook-mechanism is affixable to said lower-tubular-body and is structured and arranged to hold the pole of a pool accessory.

Preferably, the pole-clamp system may of an adjustable height between 5½ inches and 7½ inches to fit within the skimmer-inlet of a standard pool, with pole-hook-mechanism is of an overall height of approximately 3½ inches and structured and arranged to receive and hold the pole of the pool accessory including an outside diameter of 1¼ inches.

According to another embodiment, a method for using a pole-clamping system is also disclosed herein. The method for providing a device useful for securely holding a pole of a pool accessory in an upright position using the skimmer inlet of a typical pool includes the steps of: providing a pole-clamp system, placing the pole-clamp system within a skimmer-inlet of a pool, extending the upper-tubular-body and the lower-tubular body in a vertical direction to contact in inside of the skimmer-inlet of the pool in an extended position, locking the locking-mechanism of the pole-clamp system such that the pole-clamp system remains in the extended position, affixing the pole of the pool-accessory within the pole-clamp system, removing the pool-accessory from said pole-clamp system, unlocking the locking-mechanism of said pole-clamp system, and removing the pole-clamp system from the skimmer-inlet of the pool.

Additionally, a kit for a pole-clamp system is disclosed, the kit comprising: said upper-tubular-body, a lower-tubular-body, a locking-mechanism, a, upper-foot, a lower-foot, a pole-hook-mechanism, and a set of user instructions.

The present invention holds significant improvements and serves as a pole-clamping system. Preferably, a pool skimmer should provide a convenient device useful for holding a pool accessory by the pole, with the pole in an upright position and, yet would operate reliably and be manufactured at a modest expense. Thus, a need exists for a reliable pole-clamping system to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, pole-clamping system, constructed and operative according to the teachings of the present disclosure.

The various embodiments of the present invention will hereinafter be described in conjunction with the appended drawings, wherein like designations denote like elements.

DETAILED DESCRIPTION

Figure 1:
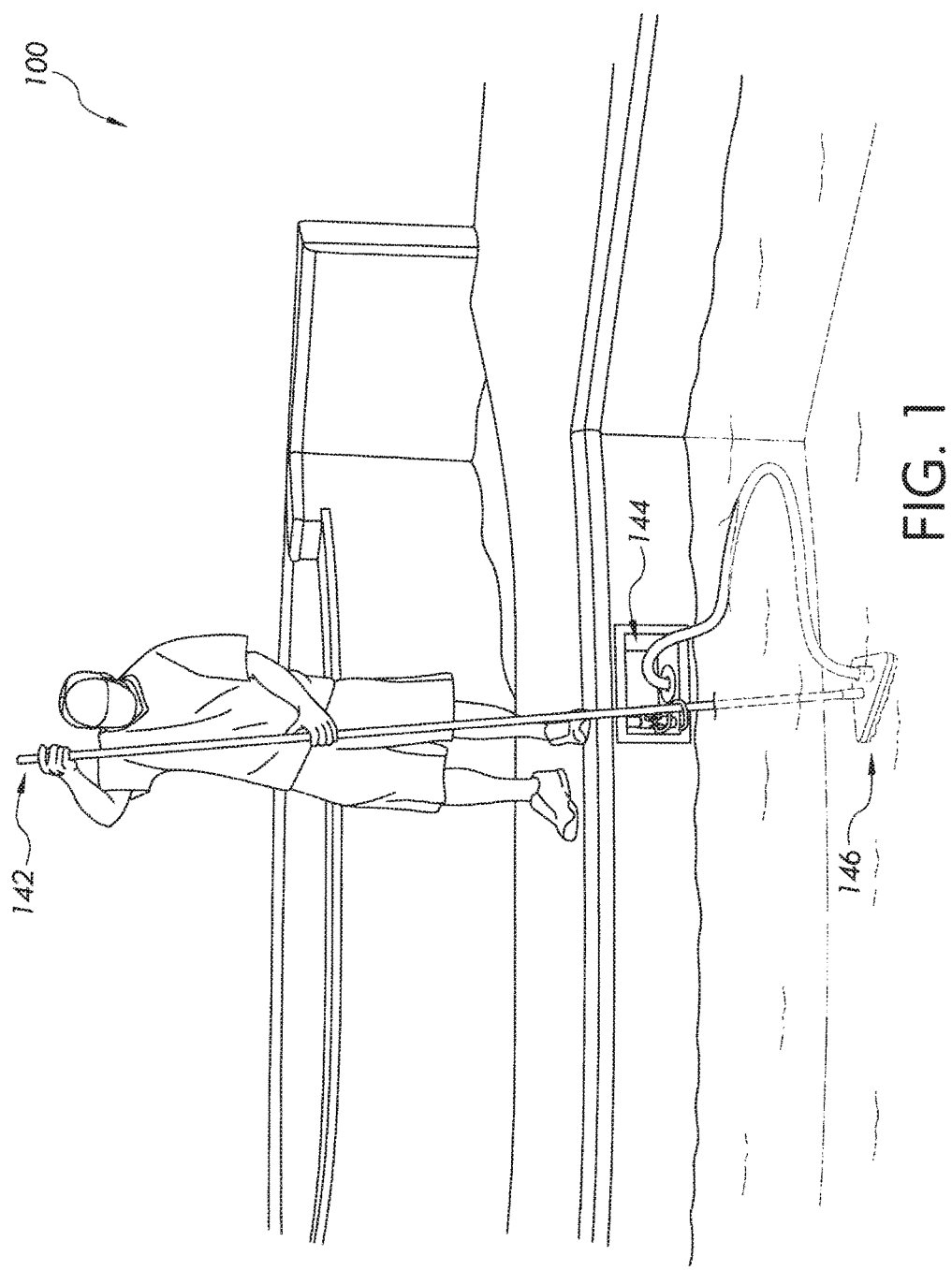
FIG. 1 shows a perspective view illustrating a pole-clamping system during an 'in-use' condition according to an embodiment of the disclosure.
Figure 2:
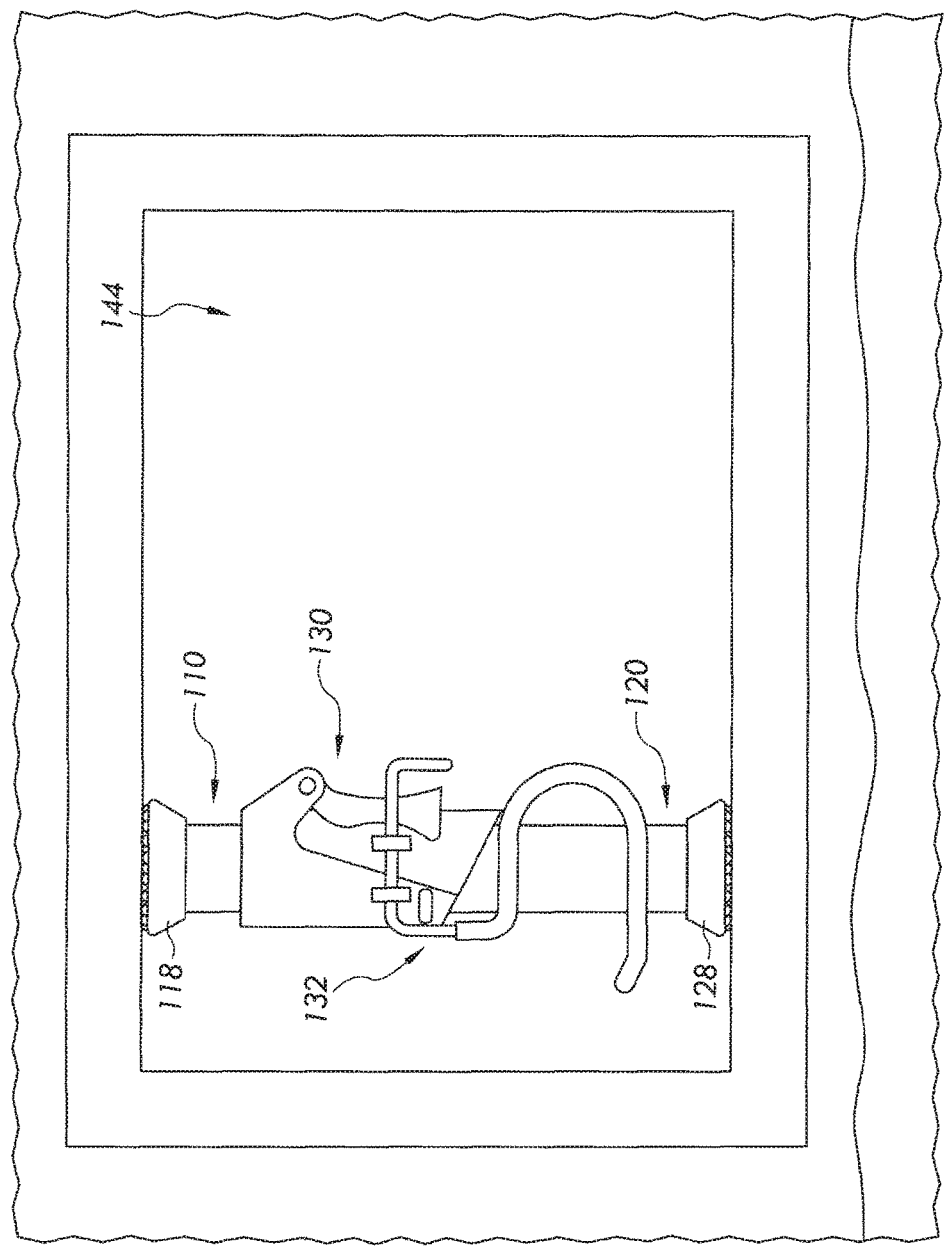
FIG. 2 is a perspective view illustrating the pole-clamping system removably affixed within a pool skimmer inlet according to an embodiment of the present invention of the disclosure.
Figure 3:
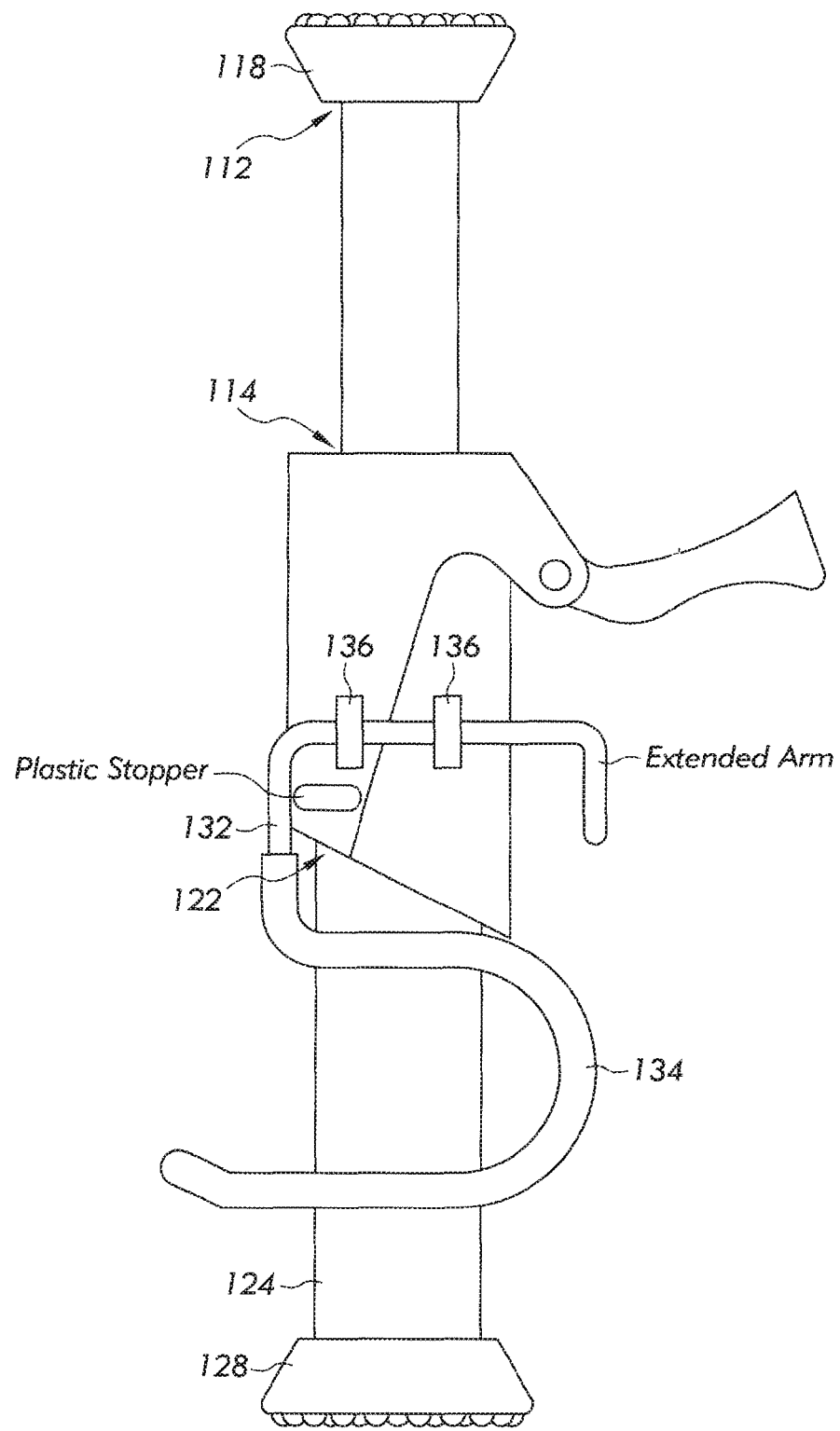
FIG. 3 is a perspective view illustrating the pole-clamping system according to an embodiment of the present disclosure.
Figure 4:
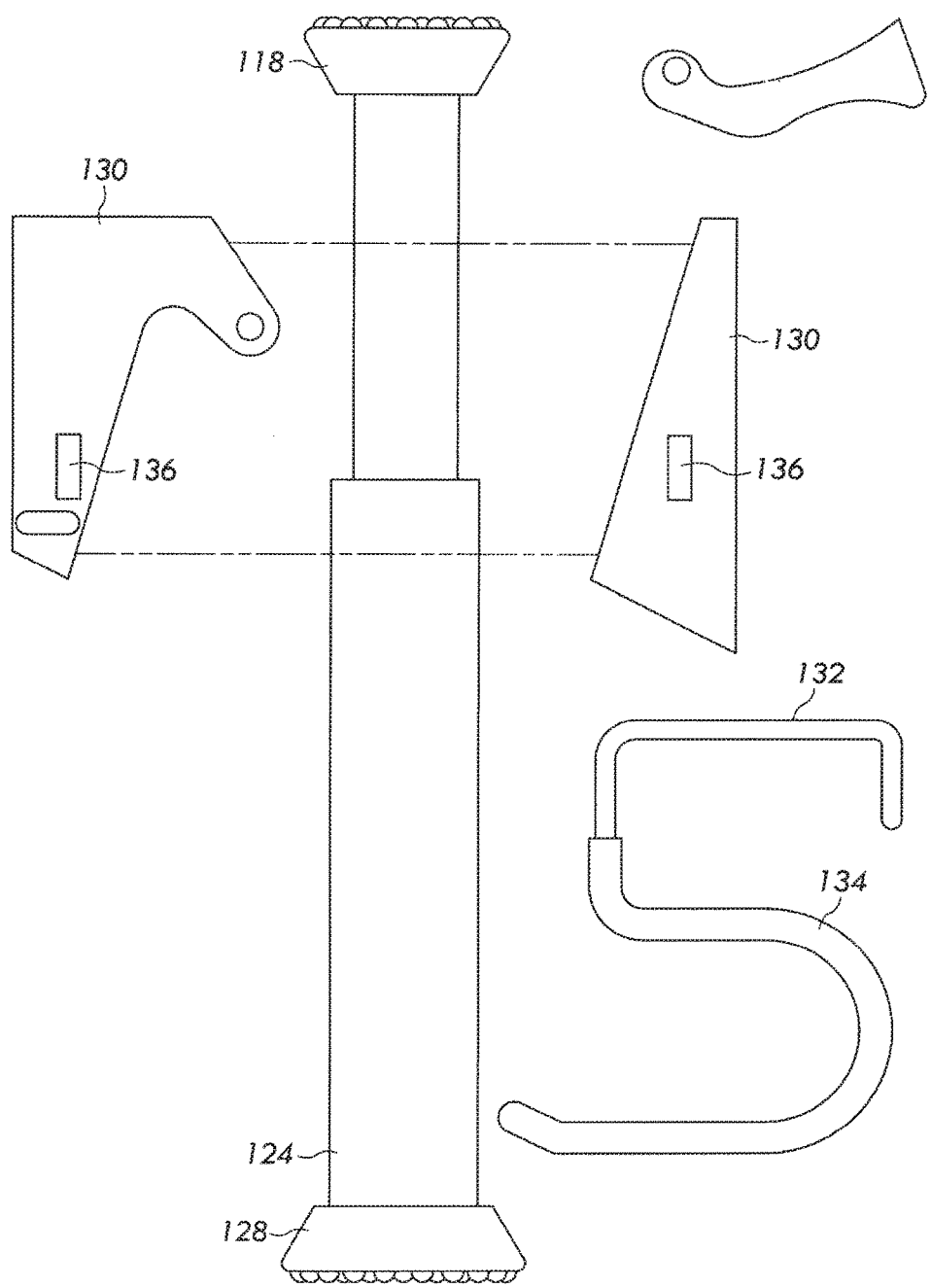
FIG. 4 is an exploded perspective view illustrating the pole-clamping system according to an embodiment of the present disclosure.

As discussed above, embodiments of the present disclosure relate to pool skimmers and more particularly to a pole-clamping system as used to improve the holding of a pool accessory in an upright position via a pole of the pool accessory.

Generally speaking, a pole-clamping system is a type of accessory for swimming pools that allows a user to affix an accessory pole in an upright position. The device includes two pieces that telescoping slide within each other and additionally include tips at each the upper and lower ends. The extension range includes 5½ inches to 7½ inches and features a lever operated clamp to secure the device at the desired extension.

The device is intended to be seated in a vertical orientation in the skimmer inlet of the pool and includes a coated hook, where the skimmer pole may be removably affixed. The device may be useful for allowing a user to hold, store and/or maintain the pool accessory within the pool in an upright position during periods of inactive use. Pole-clamp system is constructed with a net-positive-buoyancy such that pole-clamp system floats unsupported in water.

Referring now more specifically to the drawings by numerals of reference there is shown in FIGS. 1-4, various views of pole-clamping system 100 comprising upper-tubular-body 110, lower-tubular-body 120, locking-mechanism 130, upper-foot 118, lower-foot 128, and pole-hook-mechanism 132. Pole-clamp system 100 is structured and arranged to be removably and adjustably insertable within skimmer-inlet 144 of a pool to hold pool-accessory 146 via pole 142 of pool-accessory 146.

Embodiments of upper-tubular-body 110 comprise upper-end 112, lower-end 114, upper-tubular-circumference in both functional and structural combination; upper-foot 118 is affixable to upper-tubular-body 110 to provide increased traction during use. Embodiments of lower-tubular-body 120 comprise top-end 122, bottom-end 124, and lower-tubular-circumference, also in functional and structural combination; lower-foot 128 is affixable to lower-tubular-body 120 to provide increased traction during use. Both upper-foot 118 and lower-foot 128 are removable and replaceable in some embodiments.

In embodiments, upper-tubular-circumference of upper-tubular-body 110 is smaller in dimension (i.e., in diameter and circumference) than lower-tubular-circumference of lower-tubular-body 120 such that upper-tubular-body 110 is slideably insertable within lower-tubular-body 120 to allow for a variable-length of pole-clamp system 100 to accommodate different skimmer-inlet(s) if various sizes and/or shapes.

Embodiments of locking-mechanism 130 selectively and securely lock upper-tubular-body 110 within lower-tubular-body 120 to maintain the variable-length of pole-clamp system 100 during use. Locking-mechanism 130 securely locks upper-tubular-body 110 within lower-tubular-body 120 via a lever-button, in embodiments.

Embodiments of pole-hook-mechanism 132 are affixable to lower-tubular-body 120 and pole-hook-mechanism 132 is structured and arranged to hold pole 142 of pool-accessory 146. Pole-hook-mechanism 132 is of an overall height of approximately 3½ inches, in some embodiments, with pole-hook-mechanism 132 structured and arranged to receive and hold pole with an outside diameter of 1¼ inches.

Upper-tubular-body 110 and lower-tubular-body 120 may be constructed from a plastic-material for increased corrosion resistance and longevity of use in a wet environment, in some embodiments. Also, upper-foot 118 and lower-foot 128 may be constructed from a rubberized material for increased traction during use. Pole-hook-mechanism 132 includes outer-sleeve (in certain embodiments) constructed from rubberized material to increase the gripping ability (upon pole 142) of pole-hook-mechanism 132 during use. Embodiments of pole-hook-mechanism 132 further includes a tension-spring (not shown) to provide a downward pressure upon pole 142 of pool-accessory 146 to provide increased stability. Also, pole-hook-mechanism 132 is affixed to lower-tubular-body 120 via a pair of loop-fittings 136 in some embodiments.

Additional embodiments of upper-tubular-body 110, lower-tubular-body 120, upper-foot 118, lower-foot 128, pole-hook-mechanism 132, and outer-sleeve 134 may include other materials dependent upon user preferences and site specific conditions (e.g., water and/or ambient temperature, pool water chemical composition, ultra-violet resistance, durability, etc.).

Pole-clamp system 100 may be sold as a kit comprising the following parts: at least one upper-tubular-body 110; at least one lower-tubular-body 120; at least one locking-mechanism 130; at least one upper-foot 118; at least one lower-foot 128; at least one pole-hook-mechanism 132; and at least one set of user instructions. The kit has instructions such that functional relationships are detailed in relation to the structure of the invention (such that the invention can be used, maintained, or the like in a preferred manner).

Pole-clamping system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different attachments and combinations, parts may be sold separately, etc., may be sufficient.

Figure 5:
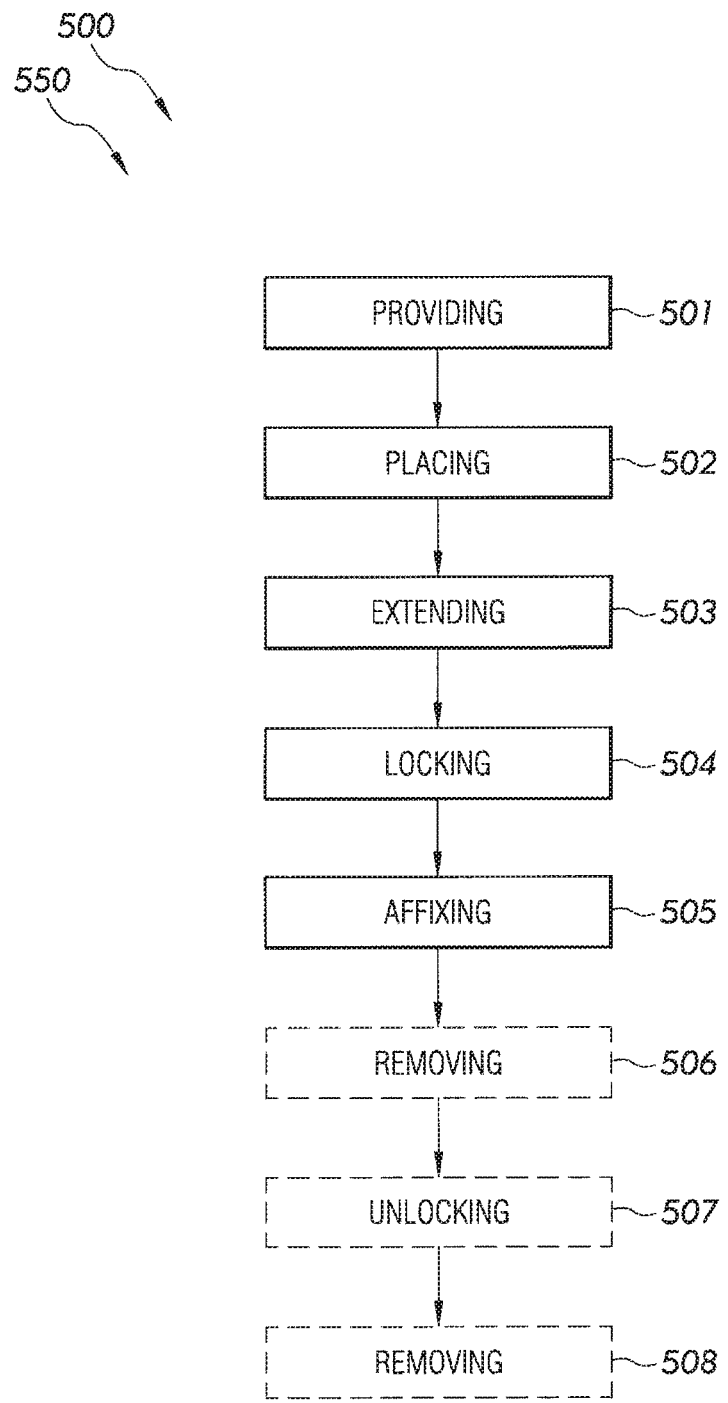
FIG. 5 is a flow diagram illustrating a method of use for pole-clamping system according to an embodiment of the present disclosure.

Referring now to FIG. 5 showing a flow diagram 550 illustrating method of use 500 for pole-clamp system 100 according to an embodiment of the present invention of FIGS. 1-4. As shown, method of use 500 may comprise the steps of: step one 501, providing pole-clamp system 100; step two 502, placing pole-clamp system 100 within skimmer-inlet 144 of a pool; step three 503, extending upper-tubular-body 110 and lower-tubular body 120 in a vertical direction to contact with inside of skimmer-inlet 144 of the pool in an extended position; step four 504, locking locking-mechanism 130 of pole-clamp system 100 such that pole-clamp system 100 remains in the extended position; step five 505, affixing pole 142 of pool-accessory 146 within pole-clamp system 100; step six 506, removing pool-accessory 146 from pole-clamp system 100; step seven 507, unlocking locking-mechanism 130 of pole-clamp system 100; and step eight 508, removing pole-clamp system 100 from skimmer-inlet 144 of the pool.

It should be noted that steps six, seven, and eight (506, 507, 508) are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pole-clamp system comprising:
    an upper-tubular-body including,
        an upper-end,
        a lower-end, and
        an upper-tubular-circumference,
        said upper-end, said lower-end, and said upper-tubular-circumference being in functional and structural combination,
    a lower-tubular-body,
        a top-end,
        a bottom-end, and
        a lower-tubular-circumference,
        said top-end, said bottom-end, and said lower-tubular-circumference being in functional and structural combination,
    a locking-mechanism,
    an upper-foot,
    a lower-foot, and
    a pole-hook-mechanism,
    wherein said upper-foot is affixable to said upper-tubular-body to provide increased traction during use;
    wherein said lower-foot is affixable to said lower-tubular-body to provide said increased traction during use;
    wherein said upper-tubular-circumference of said upper-tubular-body is smaller in dimension than said lower-tubular-circumference of said lower-tubular-body such that said upper-tubular-body is slideably insertable within said lower-tubular-body to allow for a variable-length of said pole-clamp system;
    wherein said locking-mechanism selectively and securely locks said upper-tubular-body within said lower-tubular-body to maintain said variable-length of said pole-clamp system during use;
    wherein said pole-hook-mechanism is affixable to said lower-tubular-body;
    wherein said pole-hook-mechanism is structured and arranged to hold a pole; and
    wherein said pole-clamp system is structured and arranged to be removably and adjustably insertable within a skimmer-inlet of a pool to hold a pool-accessory via said pole of said pool-accessory.

2. The pole-clamp system of claim 1 wherein said upper-tubular-body is constructed from a plastic-material for increased corrosion resistance and longevity of use in a wet environment.

3. The pole-clamp system of claim 1 wherein said lower-tubular-body is constructed from a plastic-material for increased corrosion resistance and longevity of use in a wet environment.

4. The pole-clamp system of claim 1 wherein said upper-foot is constructed from a rubberized material for increased traction during use.

5. The pole-clamp system of claim 1 wherein said lower-foot is constructed from a rubberized material for increased traction during use.

6. The pole-clamp system of claim 1 wherein said pole-hook-mechanism is constructed from a stainless-steel material for strength, durability and longevity during use.

7. The pole-clamp system of claim 1 wherein said pole-hook-mechanism further includes an outer-sleeve constructed from rubberized material to increase a gripping ability of said pole-hook-mechanism during use.

8. The pole-clamp system of claim 1 wherein said pole-hook-mechanism further includes a tension-spring to provide a downward pressure upon said pole of said pool-accessory for increased stability during use.

9. The pole-clamp system of claim 1 wherein said pole-hook-mechanism is affixed to said lower-tubular-body via a pair of loop-fittings.

10. The pole-clamp system of claim 1 wherein said pole-clamp system is constructed with a net-positive-buoyancy such that said pole-clamp system floats in water.

11. The pole-clamp system of claim 1 wherein said pole-clamp system is of an adjustable height between 5½ inches and 7½ inches to fit within said skimmer-inlet of a standard pool.

12. The pole-clamp system of claim 1 wherein said upper-foot is removable and replaceable.

13. The pole-clamp system of claim 1 wherein said lower-foot is removable and replaceable.

14. The pole-clamp system of claim 1 wherein said pole-hook-mechanism is of an overall height of approximately 3½ inches.

15. The pole-clamp system of claim 1 wherein said pole-hook-mechanism is structured and arranged to receive and hold said pole with an outside diameter of 1¼ inches.

16. The pole-clamp system of claim 1 wherein said locking-mechanism securely locks said upper-tubular-body within said lower-tubular-body via a lever-button.

17. A pole-clamp system comprising:
an upper-tubular-body including,
an upper-end,
a lower-end, and
an upper-tubular-circumference,
said upper-end, said lower-end, and said upper-tubular-circumference being in functional and structural combination,
a lower-tubular-body,
a top-end,
a bottom-end, and
a lower-tubular-circumference,
said top-end, said bottom-end, and said lower-tubular-circumference being in functional and structural combination,
a locking-mechanism,
an upper-foot,
a lower-foot, and
a pole-hook-mechanism,
wherein said upper-foot is affixable to said upper-tubular-body to provide increased traction during use;
wherein said lower-foot is affixable to said lower-tubular-body to provide said increased traction during use;
wherein said upper-tubular-circumference of said upper-tubular-body is smaller in dimension than said lower-tubular-circumference of said lower-tubular-body such that said upper-tubular-body is slideably insertable within said lower-tubular-body to allow for a variable-length of said pole-clamp system;
wherein said locking-mechanism selectively and securely locks said upper-tubular-body within said lower-tubular-body to maintain said variable-length of said pole-clamp system during use;
wherein said pole-hook-mechanism is affixable to said lower-tubular-body;
wherein said pole-hook-mechanism is structured and arranged to hold a pole;
wherein said pole-clamp system is structured and arranged to be removably and adjustably insertable within a skimmer-inlet of a pool to hold a pool-accessory via said pole of said pool-accessory;
wherein said upper-tubular-body is constructed from a plastic-material for increased corrosion resistance and longevity of use in a wet environment;
wherein said lower-tubular-body is constructed from a plastic-material for increased corrosion resistance and longevity of use in a wet environment;
wherein said upper-foot is constructed from a rubberized material for increased traction during use;
wherein said lower-foot is constructed from a rubberized material for increased traction during use;
wherein said pole-hook-mechanism is constructed from a stainless-steel material for strength, durability and longevity during use;
wherein said pole-hook-mechanism further includes an outer-sleeve constructed from rubberized material to increase a gripping ability of said pole-hook-mechanism during use;
wherein said pole-hook-mechanism is affixed to said lower-tubular-body via a pair of loop-fittings;
wherein said pole-clamp system is constructed with a net-positive-buoyancy such that said pole-clamp system floats in water;
wherein said pole-clamp system is of an adjustable height between 5½ inches and 7½ inches to fit within said skimmer-inlet of a standard pool;
wherein said upper-foot is removable and replaceable;
wherein said lower-foot is removable and replaceable;
wherein said pole-hook-mechanism is of an overall height of approximately 3½ inches;
wherein said pole-hook-mechanism is structured and arranged to receive and hold said pole with an outside diameter of 1¼ inches; and
wherein said locking-mechanism securely locks said upper-tubular-body within said lower-tubular-body via a lever-button.

18. The pole-clamp system of claim 17 further comprising a kit including:
said upper-tubular-body;
said lower-tubular-body;
said locking-mechanism;
said upper-foot;
said lower-foot;
said pole-hook-mechanism; and
a set of user instructions.

19. A method of using a pole-clamp system comprising the steps of:
providing a pole-clamp system;
placing said pole-clamp system within a skimmer-inlet of a pool;

extending a upper-tubular-body and a lower-tubular body in a vertical direction to contact in inside of skimmer-inlet of said pool in an extended position;

locking a locking-mechanism of said pole-clamp system such that said pole-clamp system remains in said extended position; and affixing a pole of a pool-accessory within said pole-clamp system.

20. The method of claim 19 further comprising the steps of removing said pool-accessory from said pole-clamp system;

unlocking said locking-mechanism of said pole-clamp system; and removing said pole-clamp system from said skimmer-inlet of said pool.

\* \* \* \* \*